(12) United States Patent
Rogers

(10) Patent No.: US 9,382,678 B2
(45) Date of Patent: Jul. 5, 2016

(54) STACKABLE BARRIER

(71) Applicant: Kenneth Paul Rogers, Raleigh, NC (US)

(72) Inventor: Kenneth Paul Rogers, Raleigh, NC (US)

(*) Notice: Subject to any disclaimer, the term of this patent is extended or adjusted under 35 U.S.C. 154(b) by 0 days.

(21) Appl. No.: 14/508,116

(22) Filed: Oct. 7, 2014

(65) Prior Publication Data

US 2016/0097171 A1   Apr. 7, 2016

(51) Int. Cl.

| E01F 13/00 | (2006.01) |
|---|---|
| E01F 9/018 | (2006.01) |
| E01F 9/012 | (2006.01) |
| E01F 9/013 | (2006.01) |
| E01F 9/014 | (2006.01) |
| E01F 9/03 | (2006.01) |
| B65G 57/03 | (2006.01) |
| B65G 57/16 | (2006.01) |

(52) U.S. Cl.
CPC .............. *E01F 9/018* (2013.01); *B65G 57/03* (2013.01); *B65G 57/165* (2013.01); *E01F 9/013* (2013.01); *E01F 9/014* (2013.01); *E01F 9/0122* (2013.01); *E01F 9/03* (2013.01)

(58) Field of Classification Search
CPC ......... E01F 9/013; E01F 9/018; E01F 9/0122; E01F 9/014; E01F 9/03; B65G 57/03; B65G 57/165
USPC .............................................. 404/6, 9, 12, 73
See application file for complete search history.

(56) References Cited

U.S. PATENT DOCUMENTS

| 4,142,814 | A | * | 3/1979 | Sanchez | E01F 9/087 256/1 |
|---|---|---|---|---|---|
| 4,303,349 | A | * | 12/1981 | Upton | E01F 9/087 264/294 |
| 5,639,179 | A | * | 6/1997 | Jensen | E01F 9/053 404/16 |
| 7,118,305 | B1 | * | 10/2006 | Corbett | E01F 13/12 404/6 |
| 7,794,103 | B2 | * | 9/2010 | Hoover | E01F 13/044 362/153.1 |
| 7,997,823 | B2 | * | 8/2011 | Meyers | E01F 15/003 404/6 |
| 2003/0219308 | A1 | * | 11/2003 | Boulais | E01F 15/145 404/6 |

* cited by examiner

*Primary Examiner* — Raymond W Addie
(74) *Attorney, Agent, or Firm* — NK Patent Law, PLLC

(57) ABSTRACT

A stackable barrier unit includes: an elongate main body having a top surface, a bottom surface, longitudinal ends, and two sidewalls each having an upper margin joined to the top surface a lower margin extending tower than the bottom surface of the main body. A base width defined between lower outer margins of the sidewalls is greater than a top width of the top surface. Engagement extensions having engagement features extend from the longitudinal ends for linking two or more barrier units together. The engagement features may include a tapered pin and a hole. A rib may connect the first sidewall to the second sidewall below the bottom surface. A channel may be formed in the top surface of the main body directly above and parallel to the at least one rib.

16 Claims, 9 Drawing Sheets

STACKABLE BARRIER

TECHNICAL FIELD

The present disclosure relates to barrier units and assemblies of barrier units. More particularly, the present disclosure relates to a barrier unit having advantageous stacking and linking engagement features, being easily visible for example to aircraft pilots, and being partially crushable without being easily displaced when impact.

BACKGROUND

Vehicle traffic lanes are in some circumstances tentative, and yet visible delineation between lanes is needed as well as girth and height. Flexibility as to the length, height, and layout would also be useful in a barrier assembly in, for example, an airfield environment where the use of a particular area may vary over time or may need to be repurposed or established quickly. For example, in one instance a physical barricade capable of resisting impact may be needed, and yet a border of movable lane markers may be needed nearby. Conventionally forming permanent ground based walls and other traffic control structures in tentative or suddenly arising circumstances may be too slow for timely response and resource-wasteful with regard to redeployment and reuse.

An improved barrier unit having stacking and linking features is needed.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

According to at least one embodiment, a stackable barrier unit includes: an elongate main body having a top surface and an opposite bottom surface between a first longitudinal end and an opposite second longitudinal end; a first sidewall having an upper margin joined to the top surface of the main body and a. lower margin extending lower than the bottom surface of the main body; a second sidewall having an upper margin joined to the top surface of the main body and a lower margin extending lower than the bottom surface of the main body, wherein a base width defined between lower margins of the sidewalls is greater than a top width of the top surface of the main body defined between the upper margin of the first sidewall and the upper margin of the second sidewall for stability; a first extension extending from the first longitudinal end of the main body, the first extension having afire engagement feature; and a second extension extending from the second longitudinal end of the main body, wherein the first extension is elevated relative to second extension, the second extension having a second engagement feature.

In at least one example, a distance between inner lower margins of the first and second sidewalls is greater than the top width of the top surface of the main body to permit nested stacking.

In at least one example, the first sidewall and the second sidewall diverge from each other as they extend from the bottom surface of the main body.

In at least one example, the first engagement feature comprises a downward extending pin and the second engagement feature is defined by a hole having a diameter greater than the pin.

In at least one example, the first engagement feature comprises a downward extending pin and the second engagement feature is defined by a hole having a diameter greater than the pin.

In at least one example, the first extension has a tower surface from which the pin extends downward; the pin includes a base connected to the lower surface of the first extension, and a distal end directed downward; and the base of the pin has a diameter that is greater than a diameter of the distal end of the pin such that the pin is tapered.

In at least one example, the hole defining the second engagement feature is tapered.

In at least one example, at least one rib is below the bottom surface of the main body, the rib connecting the first sidewall to the second sidewall.

In at least one example, a channel is formed in the top surface of the main body directly above and parallel to the at least one rib.

In at least one example, at least one slot is formed in the lower margin of each sidewall for lifting e stackable barrier from below.

According to at least one embodiment, a stack of nested barrier units includes: a first barrier unit including at least: an elongate main body having a top surface and an opposite bottom surface between a first longitudinal end and an opposite second longitudinal end; a first sidewall and a second sidewall on opposite lateral sides of the main body from each other, each having an upper margin joined to the top surface of the main body and a lower margin extending lower than the bottom surface of the main body; and a rib below the bottom surface of the main body, the rib connecting the first sidewall to the second sidewall; and a second barrier unit including at least: an elongate main body having a top surface and an opposite second longitudinal end, wherein a channel is formed in the top surface of the main body; a first sidewall and a second sidewall on opposite lateral sides of the main body from each other, each having an upper margin joined to the top surface of the main body and a lower margin extending lower than the bottom surface of the main body, wherein the top surface of the main body of the second barrier faces the bottom surface of the main body of the first barrier, and wherein the rib is positioned at least partially in the channel maintaining positional registration of the first and second barriers.

In at least one example, the second barrier is disposed at least partially between the first sidewall an second sidewall of the first barrier.

In at least one example, the first barrier further includes: a first extension extending from the first longitudinal end of the main body, the first extension having a. vertically extending pin; and a second extension extending from the second longitudinal end of the main body, wherein the first extension is elevated relative to second extension, and a vertically extending bore is formed through the second extension.

In at least one example, the rib includes a cylindrical extension protruding downward from the bottom surface of the main body of the first barrier.

In at least one example, the cylindrical extension has a uniform diameter, and has a profile shaped as a segment of a circle.

In at least one example, the channel is cylindrical, has a uniform diameter, and has a profile shaped as a. segment of a circle, and the diameter of the channel is greater than the diameter of the rib, According to at least one embodiment, a method of stacking barrier units includes: providing a first barrier unit including at least: an elongate main body having a top surface and an opposite bottom surface between a first longitudinal end and an opposite second longitudinal end; a first sidewall and a second sidewall on opposite lateral sides of the main body from each other, each having an upper margin joined to the top surface of the main body and a lower margin extending lower than the bottom surface of the main body such that a channel is defined between the first sidewall and the second sidewall beneath the main body; and a rib below the bottom surface of the main body, the rib connecting the first sidewall to the second sidewall; and providing a second barrier unit including at least: an elongate main body having a top surface and an opposite bottom surface between a first longitudinal end and an opposite second longitudinal end, wherein a channel is formed in the top surface of the main body; a first sidewall and a second sidewall on opposite lateral sides of the main body from each other, each having an upper margin joined to the top surface of the main body and a lower margin extending lower than the bottom surface of the main body; positioning the first barrier at least partially upon the second barrier such that the top surface of the main body of the second barrier faces the bottom surface of the main body of the first barrier, and longitudinally sliding the first barrier upon the second barrier until the rib is positioned at least partially in the channel maintaining positional registration of the first and second barriers.

In at least one example, the rib comprises a cylindrical extension protruding downward from the bottom surface of the main body of the first barrier.

In at least one example, the cylindrical extension has a uniform diameter, and as a profile shaped as a segment of a circle.

In at least one example, the channel is cylindrical, has a uniform diameter, and has a profile shaped as a segment of a circle, and wherein the diameter of the channel is greater than the diameter of the rib.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
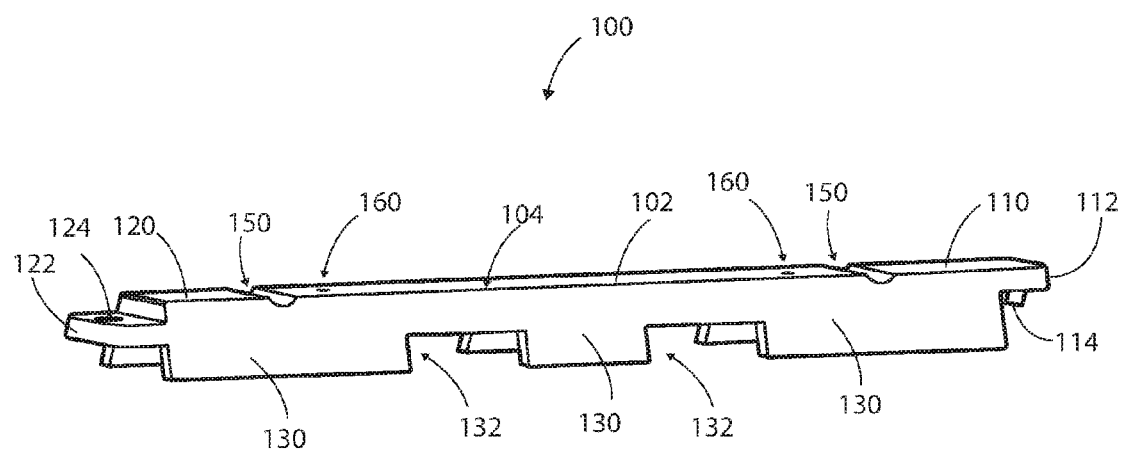
FIG. 1 is a perspective view of a barrier according to at least one embodiment.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Figure 7:
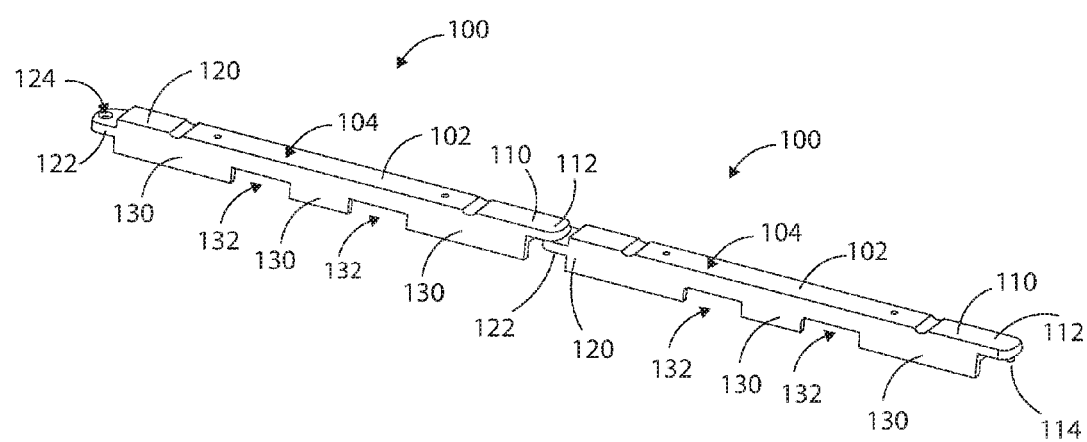
FIG. 7 is a perspective view of two barriers, each according to FIG. 1, shown linked in a linear arrangement according to at least one embodiment.
Figure 8:
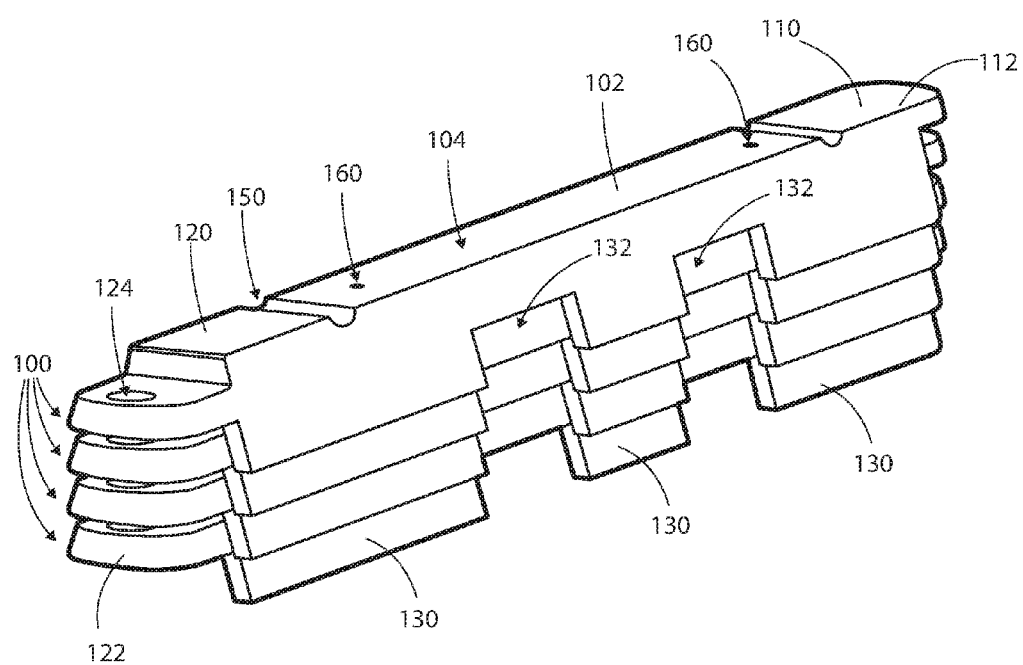
FIG. 8 is a perspective view of multiple barriers, each according to FIG. 1, shown nested in a stacked arrangement according to at least one embodiment.

FIG. 1 is a perspective view of a barrier 100 according to at least one embodiment. The barrier constitutes a single unit of which any desired arrangement or assembly can be formed by multiple single units. For example, FIG. 7 shows two barrier units linked in a linear arrangement to form a longer barrier assembly, and FIG. 8 shows multiple barrier units nested in a stacked arrangement to form a taller barrier assembly or space-efficient storage configuration. These and other exemplary multiple barrier unit assemblies, arrangements, and configurations (FIGS. 7, 8) are facilitated. by advantageous features of the single unit barrier of FIGS. 1-6.

The barrier 100 has a longitudinally extending main body 102 that terminates at opposing longitudinal first and second ends 110 and 120 from which corresponding respective features further extend that are dissimilar and mutually complementary at the two ends 110 and 120 for mating engagement.

In particular, the longitudinal end 110, nominally termed here as the first end 110, has an overhang extension 112 that extends longitudinally from an upper portion of the main body 102. The overhang extension 112 is illustrated as flush (FIGS. 1 and 4) from above with a top surface 104 of the main body and as elevated relative to a complementary tower extension 122 that extends longitudinally from the second longitudinal end 120 of the main body 102. The lower extension 122 is illustrated as flush (FIG. 3) from below with a bottom surface 106 of the main body. When two barrier units 100 are brought end to end as shown in FIG. 7, with a first end 110 of one barrier 100 oriented toward a second end 1120 of another barrier 100, the extensions 112 and 122 overlap and engage, with the extension 1112 above and overhanging the lower extension 122. The extensions 112 and 122 have complementary engagement features, illustrated as a pin and a bore respectively, although other types of engagement feature are within the scope of these descriptions.

In the particularly illustrated embodiments of the extensions 112 and 122, a tapered pin 114 (FIGS. 2, 5) extends vertically downward from the overhang extension 112 to engage a vertical bore 124 (FIG. 4) formed through the lower extension 122 to define a pintle hook engagement. The upper base 116 (FIGS. 3, 5) of the pin 114 at its attachment to the lower face of the overhang extension 112 has a broader diameter than that of the lower distal tip 118 of the pin 114 such that the pin tapers smaller toward the tip as can be seen for example in FIG. 5. The bore 124 also tapers, diametrically reducing from its upper opening 126 (FIG. 4) at the upper face of the tower extension 122 to its lower opening 128 (FIG. 3) at the lower face of the lower extension. The pin 114 and bore 1124 are advantageously tapered to facilitate entry of the relatively smaller tower tip 118 of the pin into the relatively larger upper opening 126 when two barriers 100 are to be engaged. Once a pin 114 engages a bore 124 even with some misalignment, the two barriers are urged to align pin and bore by their tapered shapes. That is, as the pin 114 drops into the bore 124, the pin and bore tend to increasingly align by slight relative movement of the two engaged barrier ends 110 and 120. In at least one example, the diameter of the base 116 of the pin is approximately twenty percent greater than the diameter of the distal tip 118, with the bore 124 similarly tapered.

In the particularly illustrated embodiments, the tapered pin 114 and tapered bore 124 have circular cross sections and can engage in any relative ground angle that permits an overhang extension 112 of one barrier 100 to overlap a tower extension 122 of another barrier in end to end fashion. Thus, an arrangement of multiple barrier units 100 linked to forma longer barrier assembly does not have to be linear as shown in FIG. 7. For example, multiple linked barrier units can follow a desired path or can be disposed in closed paths to define bounded island areas.

Returning to FIG. 1, the barrier 100 includes longitudinally and downwardly extending sidewalls 130 that extend from and support the main body 102. The lower margin of each sidewall 130 is interrupted by a pair of downward opening slots 132 that are dimensioned and spaced relative to each other to accommodate the blades of a forklift by which the barrier 100 or a stack of barriers (FIG. 8) can be lifted and transported. The slots 132 are advantageously positioned such the longitudinal center of the barrier, at approximately its center of mass, lies longitudinally between the slots 132 so the barrier can be carried by a forklift in a stable way.

Figure 5:
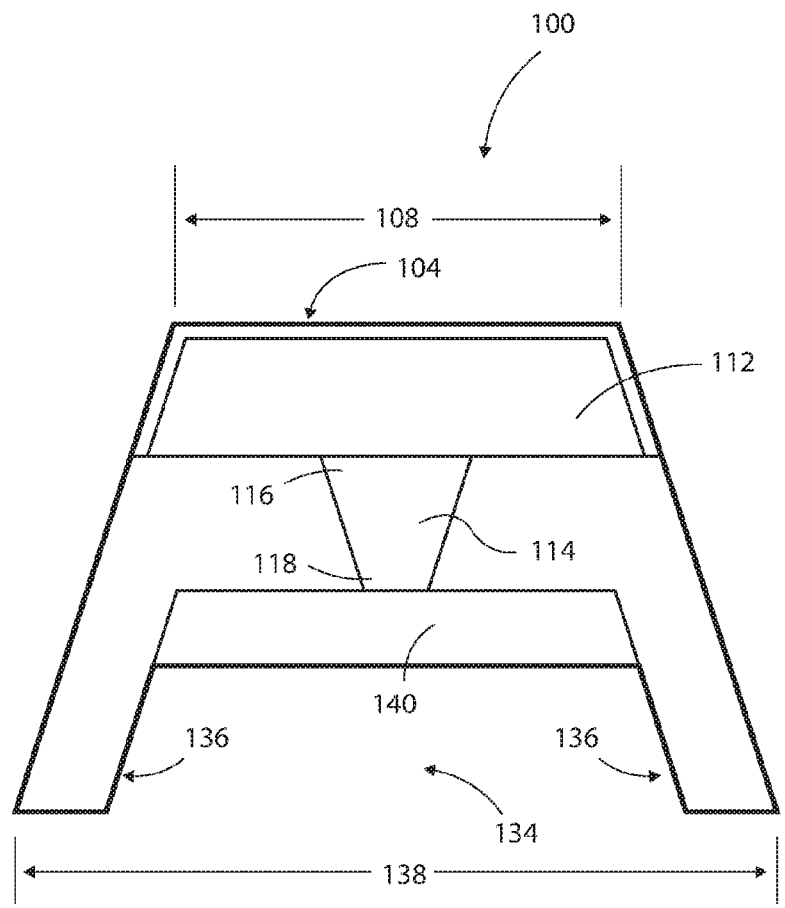
FIG. 5 is a view of a first longitudinal end of the barrier of FIG. 1.
Figure 6:
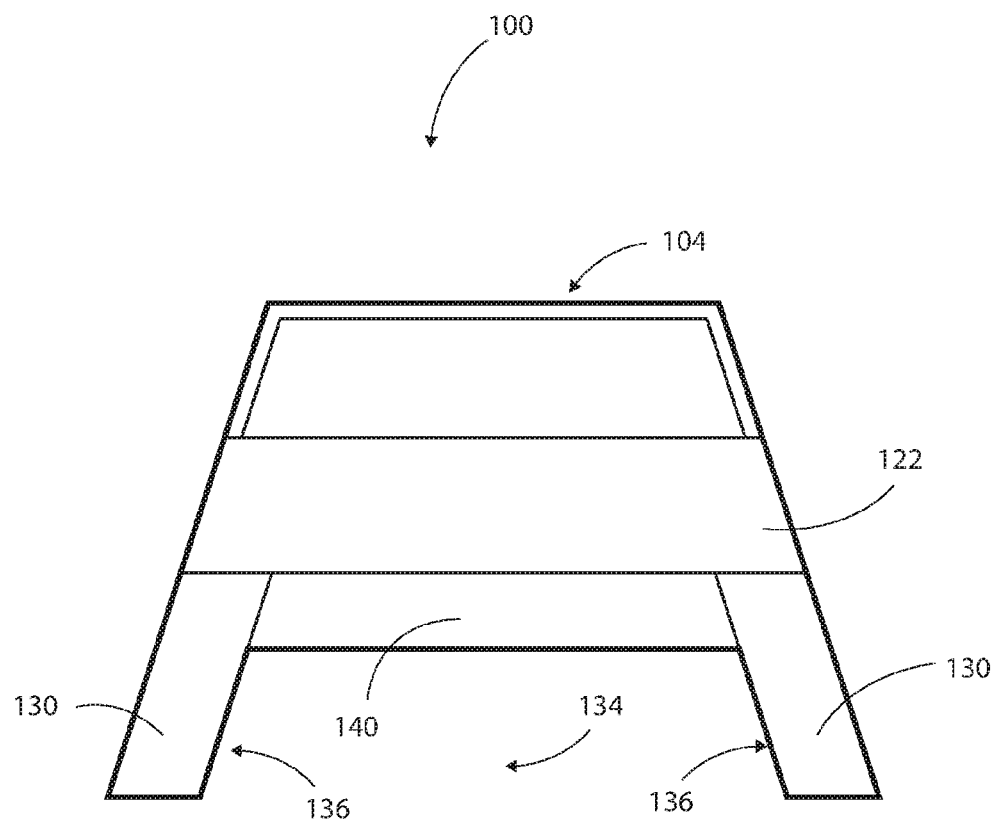
FIG. 6 is a view of an opposite second longitudinal end of the barrier of FIG 1.

The sidewalk 130 diverge as they extend downward from the main body 102 to give the barrier 100 a broadened base width 138 or footprint width, defined between the lower outer margins of the sidewalls 130, relative to a more narrow upper ridge, defined by the width 108 of the top surface 104 of the main body, as shown in FIGS. 5 and 6. As such, the barrier 100 has a stable downward expanding trapezoidal form when viewed endwise as shown in FIGS. 5 and 6.

The width 108 of the top surface 104 of the main body is dimensioned to pass between the inner faces of the lower margins the sidewalk 130 to permit nesting of barriers when stacked. The trapezoidal outer form of any lower barrier tends to urge alignment of an adjacent upper barrier when barriers are stacked (FIG. 8). A channel 134, which is defined between inner faces 136 of the sidewalls 130 (FIGS. 5, 6), reduces in width from the lower inner margins of the sidewalls 130 upward toward the bottom surface 106 of the main body 102. Thus the interior of the channel 134 of an upper barrier 100 in a stack tapers to accommodate and engage the tapered trapezoidal outer form of an adjacent lower barrier 100 in the stack. Each nearest neighbor pair of barriers 100 in a stack naturally align their sidewalk 130 one above the other such that the width of the stack is approximately the same as the footprint width 138 (FIGS. 5, 6) of any one barrier 100 as defined between outer lower margins of the sidewalls 130. Dimensions are chosen to permit stacking of multiple barriers while still allowing the separation of stacked barriers without excessive force being required.

Figure 2:
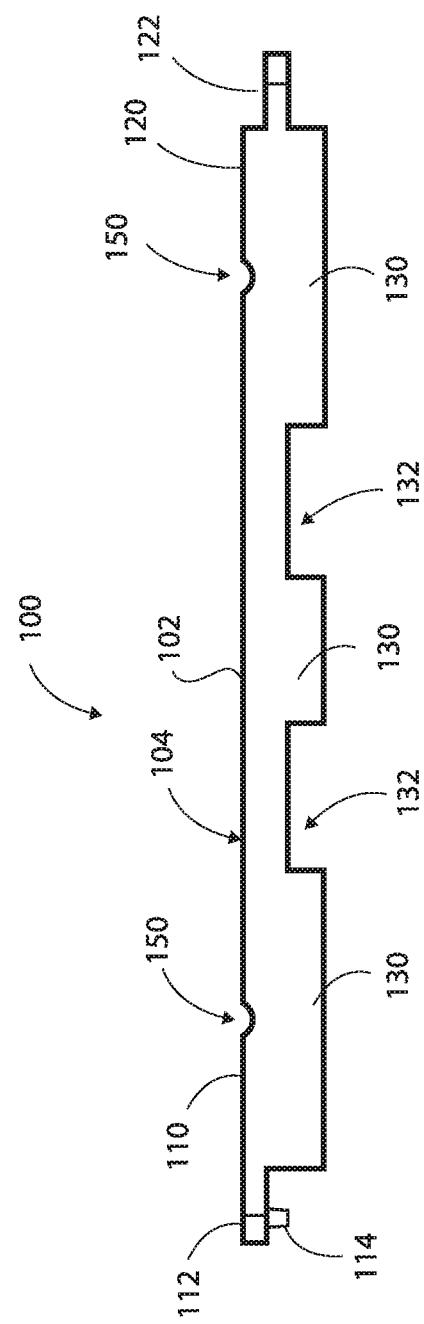
FIG. 2 is a view of a first side of the barrier of FIG. 1, with no further view of an opposite second side being necessary as a mirror image of the first side.
Figure 3:
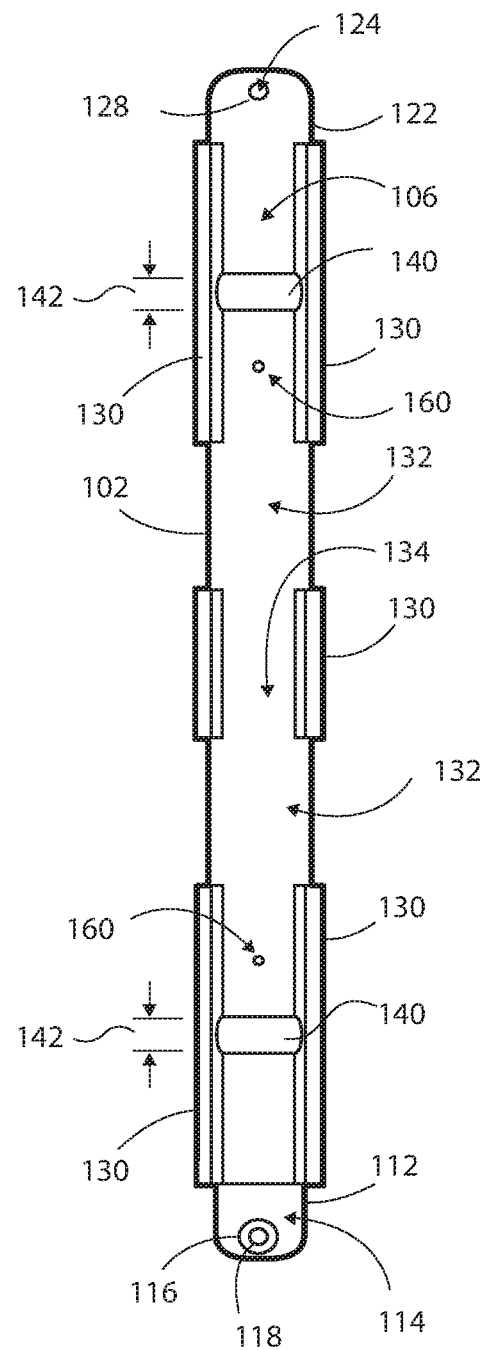
FIG. 3 is a bottom plan view of the barrier of FIG. 1.
Figure 4:
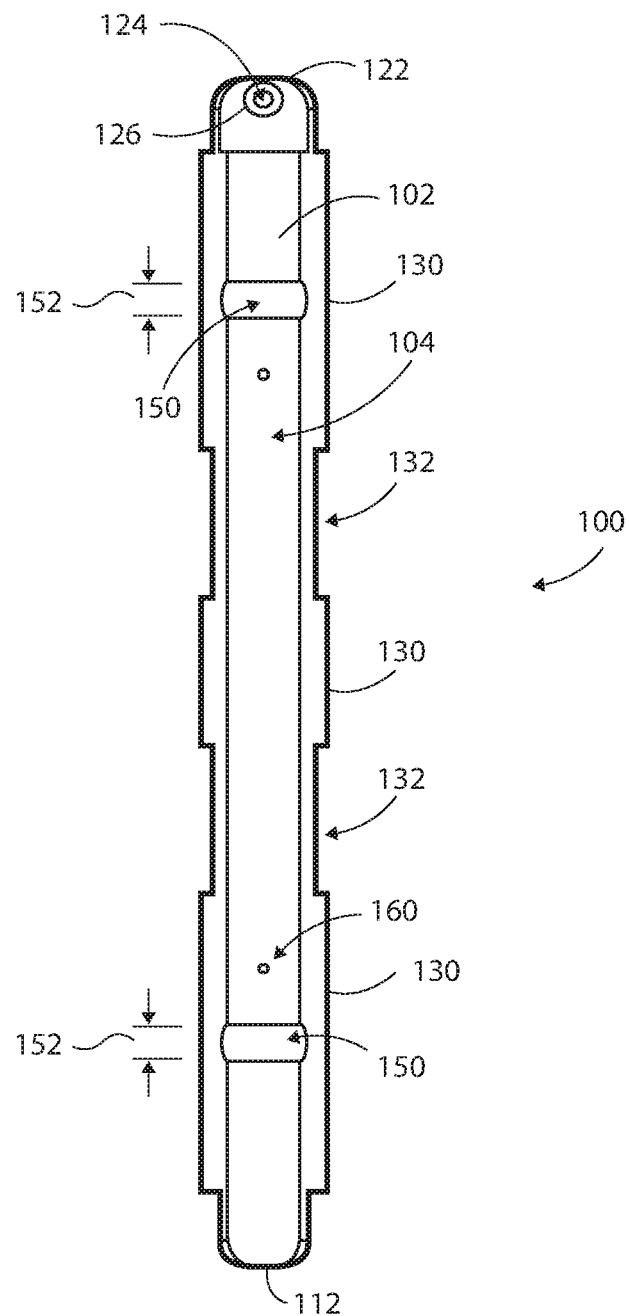
FIG. 4 is an overhead plan view of the barrier of FIG. 1.

The sidewalls 130 are strengthened by laterally extending ribs 140 (FIG. 3) beneath he main body 102, the ribs having lateral ends connected to the sidewalls such that the sidewalls are connected to each other beneath the bottom surface 106 of the main body 102 by the ribs. The ribs 140 transversely span the channel 134, interrupting the longitudinally extending planar bottom surface 106 of the main body 102 between the inner faces 136 of the sidewalls 130. Each rib 140 is illustrated as a cylindrical extension protruding downward from the bottom surface 106 (FIG. 3) of the main body 102 between the sidewalk 130, the cylindrical extension having a uniform diameter 142 at any lateral position between the sidewalls, and having a profile shaped as a segment of a circle, Laterally extending upper channels 150 are formed in the top surface 104 of e main body 102 as shown in FIGS. 1, 2, and 4. The upper channels 150 are formed at longitudinal positions corresponding to the lower ribs 140. The channels 150 are aligned with, parallel to, and directly above the ribs 140. The upper channels 1150 of a lower barrier in a stack accommodate and urge alignment of the lower ribs 140 of an adjacent upper barrier 100 in the stack. The channels are formed as transverse recesses crossing and interrupting the longitudinally extending planar top surface 104 of the main body 102. When one barrier 100 is placed upon another, the lower cylindrical ribs 140 of the upper barrier enter the upper channels 150 of the lower barrier when the barriers align their longitudinal ends. For example, an upper barrier 100 can be placed upon a lower barrier 100 and longitudinally slid into aligned position as the ribs 140 of the upper barrier encounter and enter the channels 150 of the lower barrier, permitting the upper barrier to drop down into nesting arrangement with the lower barrier, The rounded cylindrical form of the ribs and channels advantageously urge alignment of the barriers as the ribs enter the channels, thus registering the barriers into vertical alignment in a stack of barriers. A further advantage of the ribs being formed approximately as circular cylinders is that the ribs can support an upper barrier upon the top surface 104 of a lower barrier as the upper barriers slides longitudinally until the ribs 140 and channels 150 align.

Each channel 150 is illustrated as a cylindrical recess having a uniform diameter 152 (FIG. 4) at any lateral position, and having a profile shaped as a segment of a circle. The channel diameter 152 is somewhat greater than the rib diameter 142 so as to allow positive mating of multiple barriers when stacked while still allowing the separation of stacked barriers without excessive force being required. In at least one embodiment, the channel diameter 152 is approximately ten percent greater than the rib diameter 142.

Holes 160 pass entirely through the main body of the barrier 100, from the top surface 104 to the bottom surface 106. In the illustrated embodiment, a hole 160, as viewed from above as in FIG. 4, is placed between each upper channel 150 and the approximate longitudinal center of the barrier. The holes may be used in various ways. For example, cables may be passed through the holes so one or more barriers can be hoisted by a crane. A cable and lock or other security devices may be used the secure one or more barriers by use of the holes 160.

The barrier 100 in at least one embodiment has at least one internal space. For example, in at least one embodiment the barrier 100 main body 102 is hollow between sidewalk 130, top surface 104, and bottom surface 106, from the first longitudinal end 110 to the second longitudinal end 120. As such, the barrier 100 is relatively lightweight and can be moved by hand or light equipment. In the particular embodiment of FIG. 9, a fill hole formed through the top surface 106 is sealed by a removable cap 162. In that example, the cap 162 can be removed for filling of the barrier with water or other material to add weight to the barrier so as to discourage casual or accidental movement of the barrier once placed in a desired location, or even to increase its immobility for crash barrier purposes.

Figure 9:
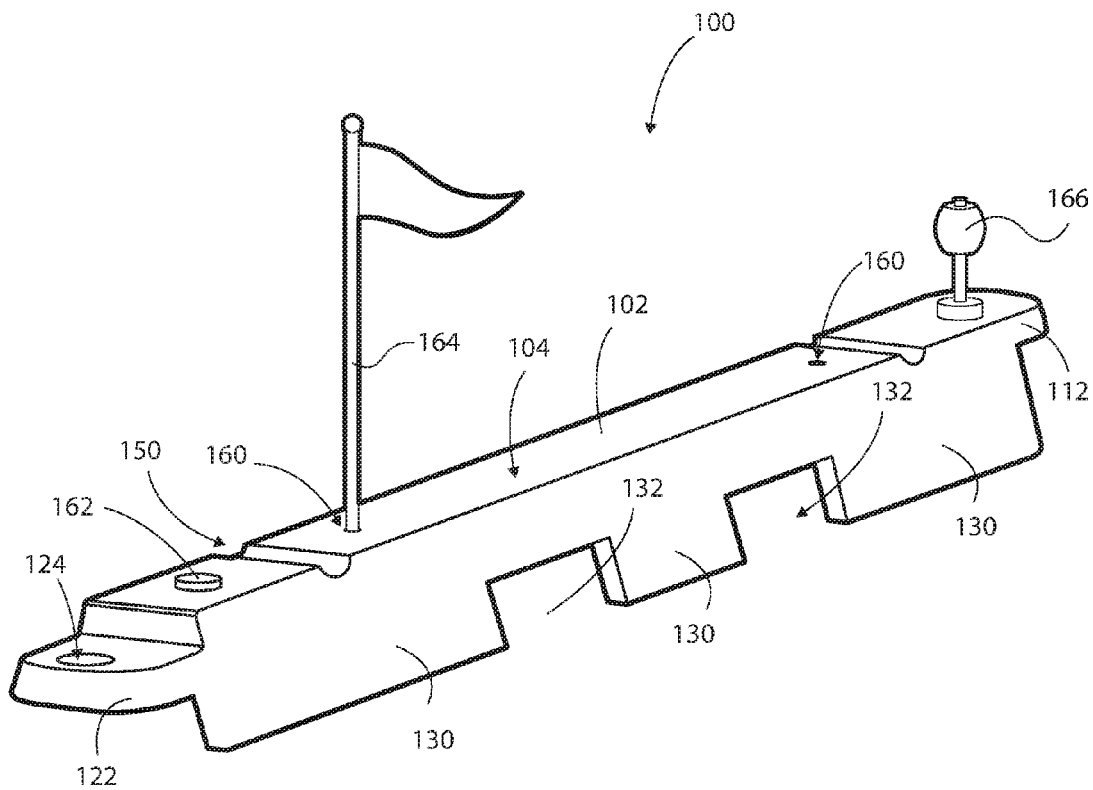
FIG. 9 is a perspective view of a barrier having a hollow interior and capped fill hole, according to at least one embodiment, shown with accessories including a flag and a light.

Other accessories can be used with the barrier 100. As shown in FIG. 9, a flag can be mounted on a pole 164 passed through the hole 160 at either end of the barrier. A light 166 can be mounted upon the barrier 100 so as to serve as a beacon or to illuminate an area.

These and other advantageous features make the barrier 100 suitable for use at an airfield, for example to border or delineate runways and taxi corridors or to form walls, particularly when stacked, to prevent unauthorized entry of persons or vehicles into protected or forbidden areas. Advantageously, the sidewalls 103 are angled upward slightly above horizontal, so as to be highly visible to a pilot, or other vehicle operator. That is, the sidewalk 103 are approximately perpendicular to the line of sight of the pilot of an approaching vehicle such as an aircraft. This may be particularly advantageous in embodiments in which the outer surfaces of the barrier 100, for example the exteriors of the sidewalls 130 are made of reflective materials or have such materials applied.

In at least one embodiment, the barrier 100 is constructed of a material that is sufficiently rigid and durable for a long service lift, but collapses under impact from a vehicle such as an aircraft. The barrier 100, for example, may be made of plastic that resists bending and is resilient such that the barrier recovers from minor deformations caused by light impacts, movement of the barrier, or temporary shape deformations caused by use on uneven surfaces. The barrier 100 promotes crushing or deformation over displacement when impacted instead of displacement. Thus, lanes or other boundaries established by one or more barriers are maintained when impacts occur.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A stackable barrier unit comprising:
   an elongate main body having a top surface and an opposite bottom surface between a first longitudinal end and an opposite second longitudinal end;
   a first sidewall having an upper margin joined to the top surface of the main body and a lower margin extending lower than the bottom surface of the main body;
   a second sidewall having an upper margin joined to the top surface of the main body and a lower margin extending lower than the bottom surface of the main body, wherein a base width defined between lower margins of the sidewalk is greater than a top width of the top surface of the main body defined between the upper margin of the first sidewall and the upper margin of the second sidewall for stability;
   a first extension extending from the first longitudinal end of the main body, the first extension having a first engagement feature;
   a second extension extending from the second longitudinal end of the main body, wherein the first extension is elevated relative to second extension, the second extension having a second engagement feature;
   at least one rib below the bottom surface of the main body, the rib connecting the first sidewall to the second sidewall; and
   a channel formed in the top surface of the main body directly above and parallel to the at least one rib,
   wherein the at least one rib comprises a cylindrical extension protruding downward from the bottom surface of the main body of the first barrier.

2. A stackable barrier unit according to claim 1, wherein a distance between inner lower margins of the first and second sidewalls is greater than the top width of the top surface of the main body to permit nested stacking.

3. A stackable barrier unit according to claim 1, wherein the first sidewall and the second sidewall diverge from each other as they extend from the bottom surface of the main body.

4. A stackable barrier unit according to claim 1, wherein one of the first engagement feature and second engagement feature comprises a downward extending pin and the other of the other of the first engagement feature and second engagement feature is defined by a hole having a diameter greater than the pin.

5. A stackable barrier unit according to claim 1, wherein the first engagement feature comprises a downward extending pin and the second engagement feature is defined by a hole having a diameter greater than the pin.

6. A stackable barrier unit according to claim 5, wherein:
   the first extension has a lower surface from which the pin extends downward;
   the pin comprises a base connected to the lower surface of the first extension, and a distal end directed downward; and
   the base of the pin has a diameter that is greater than a diameter of the distal end of the pin such that the pin is tapered.

7. A stackable barrier unit according to claim 6, wherein the hole defining the second engagement feature is tapered.

8. A stackable barrier unit according to claim 1, wherein at least one slot is formed in the lower margin of each sidewall for lifting the stackable barrier from below.

9. A stack of nested barrier units comprising:
   a first barrier unit including at least:
      an elongate main body having a top surface and an opposite bottom surface between a first longitudinal end and an opposite second longitudinal end;
      a first sidewall and a second sidewall on opposite lateral sides of the main body from each other, each having an upper margin joined to the top surface of the main body and a lower margin extending lower than the bottom surface of the main body; and
      a rib below the bottom surface of the main body, the rib connecting the first sidewall to the second sidewall; and
   a second barrier unit including at least:
      an elongate main body having a top surface and an opposite bottom surface between a first longitudinal end and an opposite second longitudinal end, wherein a channel is formed in the top surface of the main body;
      a first sidewall and a second sidewall on opposite lateral sides of the main body from each other, each having an upper margin joined to the top surface of the main body and a lower margin extending lower than the bottom surface of the main body,
   wherein the top surface of the main body of the second barrier faces the bottom surface of the main body of the first barrier,
   wherein the rib is positioned at least partially in the channel maintaining positional registration of the first and second barriers, and wherein the rib comprises a cylindrical extension protruding downward from the bottom surface of the main body of the first barrier.

10. A stack of nested barrier units according to claim 9, wherein the second barrier is disposed at least partially between the first sidewall and second sidewall of the first barrier.

11. A stack of nested barrier units according to claim 9, wherein the first barrier further comprises:
a first extension extending from the first longitudinal end of the main body, the first extension having a vertically extending pin; and
a second extension extending from the second longitudinal end of the main body, wherein the first extension is elevated relative to second extension, and a vertically extending bore is formed through the second extension.

12. A stack of nested barrier units according to claim 9, wherein the cylindrical extension has a uniform diameter, and has a profile shaped as a segment of a circle.

13. A stack of nested barrier units according to claim 12, wherein the channel is cylindrical, has a uniform diameter, and has a profile shaped as a segment of a circle, and wherein the diameter of the channel is greater than the diameter of the rib.

14. A method of stacking barrier units, the method comprising:
providing a first barrier unit including at least:
an elongate main body having a top surface and an opposite bottom surface between a first longitudinal end and an opposite second longitudinal end;
a first sidewall and a second sidewall on opposite lateral sides of the main body from each other, each having an upper margin joined to the top surface of the main body and a lower margin extending lower than the bottom surface of the main body; and
a rib below the bottom surface of the main body, the rib connecting the first sidewall to the second sidewall; and
providing a second barrier unit including at least:
an elongate main body having a. top surface and an opposite bottom surface between a first longitudinal end and an opposite second longitudinal end, wherein a channel is formed in the top surface of the main body;
a first sidewall and a second sidewall on opposite lateral sides of the main body from each other, each having an upper margin joined to the top surface of the main body and a lower margin extending lower than the bottom surface of the main body;
positioning the first barrier at least partially upon the second barrier such that the top surface of the main body of the second barrier faces the bottom surface of the main body of the first barrier, and
longitudinally sliding the first barrier upon the second barrier until the rib is positioned at least partially in the channel maintaining positional registration of the first and second barriers,
wherein the rib comprises a cylindrical extension protruding downward from the bottom surface of the main body of the first barrier.

15. A method according to claim 14, wherein the cylindrical extension has a uniform diameter, and has a profile shaped as a segment of a circle.

16. A method according to claim 15, wherein the channel is cylindrical, has a uniform diameter, and has a profile shaped as a segment of a circle, and wherein the diameter of the channel is greater than the diameter of the rib.

* * * * *